April 14, 1970   D. ENGELSMANN ET AL   3,505,936
CAMERA FOR INDOOR AND OUTDOOR PHOTOGRAPHY
Filed June 26, 1967   2 Sheets-Sheet 1

INVENTOR.
DIETER ENGELSMANN
BY HUBERT HACKENBERG
HORST KARL

April 14, 1970    D. ENGELSMANN ET AL    3,505,936
CAMERA FOR INDOOR AND OUTDOOR PHOTOGRAPHY
Filed June 26, 1967    2 Sheets-Sheet 2

INVENTOR.
DIETER ENGELSMANN
BY HUBERT HACKENBERG
HORST KARL
Michael S. Striker
Attorney

# United States Patent Office 3,505,936
Patented Apr. 14, 1970

3,505,936
CAMERA FOR INDOOR AND OUTDOOR PHOTOGRAPHY
Dieter Engelsmann, Unterhaching, near Munich, Hubert Hackenberg, Munich-Solln, and Horst Karl, Munich, Germany, assignors to Agfa-Gevaert Aktiengesellschaft, Leverkusen, Germany
Filed June 26, 1967, Ser. No. 648,724
Claims priority, application Germany, July 2, 1966, A 52,914
Int. Cl. G01j 1/00
U.S. Cl. 95—10
18 Claims

ABSTRACT OF THE DISCLOSURE

Photographic camera wherein the diaphragm can be adjusted to account for the sensitivity of film and the guide number of a source of artificial illumination. A follower tracks a marker on the film cartridge to assume a position which is a function of the sensitivity of film. A selector which is movable by the source of artificial illumination can place a motion transmitting connection between the follower and the diaphragm into a condition in which the connection adjusts the diaphragm in accordance with the sensitivity of film and as a function of the guide number of the light source. When the light source is disconnected from the camera or is moved to an inoperative position, the selector inactivates the motion transmitting connection so that the size of the diaphragm aperture can be selected by hand or by an automatic exposure meter as a function of the intensity of scene light.

BACKGROUND OF THE INVENTION

The present invention relates to photographic cameras in general, and more particularly to improvements in cameras for indoor and outdoor photography. Still more particularly, the invention relates to cameras for use with permanently installed or detachable sources of artificial light.

It is already known to provide a still camera with a device which can set the camera for operation in daylight or artificial light. When the camera is set for operation in daylight, the size of the diaphragm aperture can be selected as a function of the intensity of scene light, either by hand or by resorting to a built-in exposure meter. In such cameras, the operator will make a satisfactory exposure in artificial light if he has properly calculated the distance from the subject and has properly selected the size of the diaphragm aperture in accordance with the formula that the guide number of the source of artificial light is the product of the size of the aperture and the distance from the subject. Certain more recent types of cameras are provided with integrator systems which couple the diaphragm with the focus adjusting means in such a way that the size of the diaphragm is properly selected in response to proper selection of the focal distance when the camera is set for operation with flash. Such integrator systems are quite expensive, prone to malfunction and contribute to the bulkiness of the camera.

Accordingly, it is an important object of the present invention to provide a novel and improved camera for indoor and outdoor photography and to construct and assemble the camera in such a way that the user need not select the size of the aperture when the camera is set for operation in artificial light.

Another object of the invention is to provide a camera of the just outlined character wherein the size of the diaphragm aperture is automatically selected as a function of the sensitivity of film and as a function of the guide number of the source of artificial light when the camera is set for operation with flash or another suitable source of artificial illumination.

A further object of the instant invention is to provide a camera wherein the selection of the aperture size for operation in artificial light is fully automatic and is achieved by resorting to a relatively small number of simple, compact and inexpensive parts.

A concomitant object of the invention is to provide a camera with automatic selection of aperture size for operation in artificial light for a given range of focal distances and with a light source of given guide number.

Still another object of the invention is to provide a novel motion transmitting connection between the film cartridge and the diaphragm of a camera which embodies the above outlined features and advantages.

SUMMARY OF THE INVENTION

Our invention is embodied in a photographic camera for use in daylight or indoors, in the latter instance with a source of artificial light having a predetermined guide number, for example, with a multiple flash bulb holder. The camera comprises adjustable diaphragm means arranged to furnish a series of apertures, follower means movable to a plurality of positions each of which corresponds to a different film sensitivity, motion transmitting means interposed between the follower means and the diaphragm means and being arranged to assume a first condition in which it adjusts the diaphragm means as a function of the position of the follower means and a second condition in which the diaphragm means is adjustable (either by hand or by an automatic exposure meter) independently of the motion transmitting means, and selector means for setting the camera for operation in daylight and in artificial light. The selector means comprises means for respectively placing the motion transmitting means into the first and second condition when the camera is respectively set for operation in daylight and artificial light.

The motion transmitting means may comprise a link train or lever train which may be disengaged from the follower means when the camera is set for operation in daylight so that the diaphragm is then adjustable by hand or by an automatic exposure meter as a function of the intensity of scene light. The exposure meter may be adjusted by the follower means so that it can determine the size of the diaphragm aperture as a function of the intensity of scene light and as a function of the sensitivity of film. When the selector means sets the camera for operation with flash or with another suitable source of artificial light, the motion transmitting means selects the size of the aperture as a function of the sensitivity of film and as a function of the guide number of the source. The camera is then set to produce satisfactory exposures within a predetermined distance range from the subject.

The novel features which are considered as characteristic of the invention are set forth in particular in the appended claims. The improved camera itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
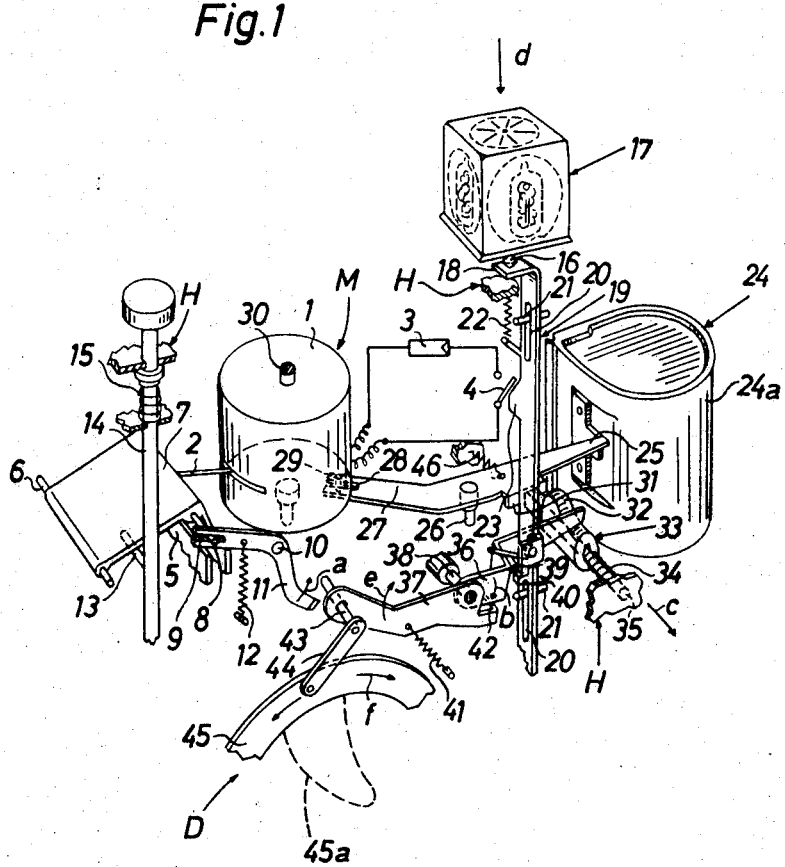
FIG. 1 is a perspective view of a portion of a still camera with built-in automatic exposure meter which embodies one form of our invention and wherein the motion transmitting means is in a condition ready to select the size of the aperture as a function of the sensitivity of film and as a function of the guide number of a multiple flash bulb holder.

Referring first to FIG. 1, there is shown a portion of a still camera having a housing certain parts of which are shown at H, and an iris diaphragm D which includes a series of pivotable blades 45a (only one shown) operatively connected with a diaphragm ring 45. This ring is movable between a plurality of angular positions (in and counter to the direction indicated by the arrow f) to furnish a series of apertures. When the camera is set for operation in daylight, the size of the aperture furnished by the blades 45a of the diaphragm D is a function of the intensity of scene light and a function of the sensitivity of film which is being used in the camera for making a particular set of exposures. The film is stored in a customary supply cartridge 24 having a casing or shell 24a and a marker or indicator 25 positioned with reference to the casing 24a in such a way that its position is indicative of the sensitivity of film in the cartridge 24. During insertion of the cartridge 24 into the corresponding chamber of the housing H, the marker 25 displaces a follower 27 against the opposition of a helical contraction spring 46 so that the position of the follower 27 in fully inserted position of the cartridge 24 is a function of the sensitivity of film which is stored in the casing 24a. The follower 27 is constituted by a two-armed lever which is pivotable on a fixed vertical pivot pin 26. One arm of the lever 27 engages with the marker 25 and the other arm is formed with an open slot 28 for a post 29 affixed to the body or case 1 of a moving-coil instrument M. This instrument forms part of an automatic exposure meter including an electric circuit which can select the size of the diaphragm aperture as a function of the intensity of scene light. The output member or needle 2 of the instrument M can swing about the shaft 30 of the body 1 and travels along a fixed back support 5. A tracking member or sensor 7 has a stepped or inclined face which can move into abutment with the needle 2 under the bias of a spring 12 attached to one arm of an intermediate lever 11 which is pivotable on a horizontal pin 10 and is provided with a slot 9 for a post 8 attached to the tracking member 7. The shaft of the tracking member 7 is shown at 6 and this tracking member is normally held in an inoperative position by a projection 13 provided on a vertically reciprocable shutter release trigger 15 which is biased upwardly by a relatively strong helical return spring 15. The spring 15 is stronger than the spring 12 so that the tracking member 7 remains in the illustrated inoperative position when the trigger 14 is not depressed by hand.

The aforementioned electric circuit further comprises a light-sensitive element 3 which is exposed to scene light and a master switch 4 which normally tends to assume an open position. The element 3 may be constituted by a photoelectric cell or by a photosensitive resistor; in the latter instance, the circuit further comprises a battery or another suitable source of electrical energy.

The switch 4 is closed when the camera is set for operation in daylight. Such setting is effected by a selector 19 which is constituted by a vertically reciprocable slide having vertical slots 20 receiving guide pins 21 which are affixed to the housing H. A return spring 22 biases the selector 19 to a first or upper end position in which a trip 23, which can form an integral part of the selector, closes the master switch 4. The circuit of the switch 4 is then completed and the angular position of the needle 2 will be a function of the intensity of scene light which impinges upon the light-sensitive element 3. Of course, the angular position of the needle 2 is also a function of the sensitivity of film in the cartridge 24 because the marker 25 causes the follower 27 to place the body 1 into an angular position which reflects the sensitivity of film. If the operator thereupon wishes to make an exposure in daylight, the trigger 14 is depressed against the opposition of the return spring 15 so that the projection 13 moves downwardly, as viewed in FIG. 1, and permits the spring 12 to pivot the intermediate lever 11 in a counterclockwise direction (arrow a) until the stepped or inclined face of the tracking member 7 engages the needle 2 and presses the latter against the back support 5. The right-hand arm of the lever 11 engages a shaft 43 which forms part of a motion transmitting connection between the follower 27 and the diaphragm ring 45. The shaft 43 can change the angular position of the ring 45 through the intermediary of a link 44 so that the size of the aperture defined by the blades 45a will be a function of the intensity of scene light and a function of the sensitivity of film in the cartridge 24. The trigger 14 will release the shutter (not shown) after the tracking member 7 ceases to pivot about the shaft 6, i.e., after the needle 2 is securely clamped between the stepped or inclined face of the tracking member and the back support 5. The manner in which the angular position of the needle 2 changes in response to changes in intensity of scene light is well known from the art of cameras with automatic exposure control.

In accordance with a feature of our present invention, the selector 19 is movable to a second or lower end position in order to set the camera for operation in artificial light. In the embodiment of FIG. 1, the source of artificial light is constituted by a multiple flash bulb holder 17 of the type commonly known as "Flashcube." This multiple flash bulb holder 17 is insertable into an indexible socket (not shown) in the top wall of the housing H whereby its downwardly extending portion or plug 16 engages and depresses a bent-over lug 18 at the upper end of the selector 19 and moves the latter to second or lower end position against the opposition of the spring 22 which tends to maintain the selector in the first or upper end position corresponding to setting of the camera for daylight operation. The selector 19 can change the condition of the aforementioned motion transmitting connection between the follower 27 and the diaphragm ring 45, this connection having a first condition when the camera is set for operation in daylight and in which the diaphragm ring 45 can be adjusted by hand and/or by the aforementioned intermediate lever 11, and a second condition when the camera is set for operation in artificial light furnished by a source having a predetermined guide number whereby the motion transmitting connection automatically selects the size of the diaphragm aperture as a function of the sensitivity of film which is accommodated in the cartridge 24 and as a function of the predetermined guide number.

In addition to the aforementioned parts 43 and 44, the motion transmitting connection comprises a control member in the form of a cam 33 having a stepped or gradually sloping cam face 32 and being reciprocable along a fixed guide rod 35 under or against the bias of a helical spring 34. The cam 33 cannot rotate on the guide rod 35. The axial position of the cam 33 with reference to the guide rod 35 is a function of the sensitivity of film in the cartridge 24 because the follower 27 has a bent-over portion or lug 31 which is in abutment with the rear end face of the cam 33 and displaces the latter against the opposition of the spring 34 (arrow c) when the follower 27 is rocked by the marker 25 during insertion of cartridge 24 into the corresponding chamber of the housing H.

The face 32 of the cam 33 can be tracked by a one-armed lever 36 which is pivotable on a horizontal shaft 38 relative to or together with a second intermediate lever 37 which carries the aforementioned shaft 43 for the link 44. The shaft 38 is fixed to the housing H. One arm of a torsion spring 39 which is mounted on a lower portion of the selector 19 bears against the lever 36 and tends to turn the latter in a clockwise direction (arrow b). When the selector 19 is allowed to assume its upper end position (spring 22), the spring 39 biases the lever 36 against a condition-changing portion or stop 40 of the selector 19 so that the lever 36 cannot reach the face 32 of the cam 33. The intermediate lever 37 is permanently biased by a helical spring 41 which tends to pivot it in a counterclockwise direction and to maintain the ring 45 in an end position corresponding to a maximum size of the diaphragm aperture. The intermediate lever 37 is free to follow the bias of the spring 41 when the lever 36 abuts against the stop 40 in the upper end position of the selector 19. This lever 37 is provided with a bent-over motion receiving portion 42 which can be engaged by the lever 36 when the selector 19 is moved to the lower end position in response to depression of its lug 18 by the plug 16 of a fully inserted multiple flash bulb holder 17 (see the arrow $d$). The lever 36 then rocks the intermediate lever 37 in a clockwise direction (arrow $e$) and the parts 43, 44 select the size of the diaphragm aperture as a function of the sensitivity of film in the cartridge 24.

It is clear that the diaphragm D can be replaced by any other suitable diaphragm, for example, with a diaphragm having only two blades one of which trails the other thereof.

The operation is as follows:

If the operator wishes to make an exposure in artificial light, he selects an appropriate film having a given sensitivity which is indicated by the position of the marker 25 with reference to the casing or shell 24a. During insertion of the cartridge 24 into the corresponding chamber of the housing H, the marker 25 pivots the follower 27 in a clockwise direction (against the opposition of the spring 46), and the follower 27 comes to a halt when the cartridge 24 is fully inserted into its chamber. The post 29 on the body 1 of the moving coil instrument M shares such pivotal movement of the follower 27 because it extends into the slot 28 so that the body 1 assumes an angular position which is indicative of the sensitivity of film in the cartridge 24. The needle 2 shares all angular movements of the body 1. Of course, the lug 31 of the follower 27 also displaces the control cam 33 against the opposition of the spring 34 (arrow $c$) so that the axial position of the cam 33 with reference to the guide rod 35 is a function of the sensitivity of film in the cartridge 24.

In the next step, the operator introduces the plug 16 of a fresh multiple flash bulb holder 17 into the aforementioned indexible socket in the top wall of the housing H. The plug 16 moves the selector 19 from the upper end position to the lower end position (arrow $d$) whereby the camera is set for operation in artificial light and the exposure meter is automatically disconnected from the diaphragm D because the trip 23 of the selector 19 moves downwardly and away from the master switch 4 which opens and deenergizes the electric circiut of the exposure meter. When the plug 16 is properly inserted into its socket, it automatically holds the selector 19 in the lower end position against the opposition of the return spring 22. Such position of the selector 19 is shown in FIG. 1. It will be seen that the stop 40 has descended to such position that the torsion spring 39 can bias the one-armed lever 36 against the face 32 of the control cam 33 so that the angular position of the lever 36 is a function of the sensitivity of film in the cartridge 24. This will be readily understood since the axial position of the cam 33 with reference to the guide rod 35 has been selected by the lug 31 of the follower 27 during insertion of the cartridge 24. The lever 36 bears against the motion receiving portion 42 of the intermediate lever 37 so that the latter turns in a clockwise direction (arrow $e$) and causes the parts 43, 44 to change the angular position of the diaphragm ring 45, i.e., the size of the aperture defined by the blades 45a is a function of the sensitivity of film in the cartridge 24 and a function of the guide number of the source of artificial light (multiple flash bulb holder 17).

When the trip 23 moves away from the movable contact of the master switch 4 to effect deenergization of the electric circuit in the exposure meter, the needle 2 automatically assumes an end position in which it prevents such angular movements of the tracking member 7 which could cause the intermediate lever 11 to engage with the shaft 43 for the link 44. In other words, when the operator makes an exposure with flash by depressing the release trigger 14 against the opposition of the spring 15, the needle 2 arrests the tracking member 7 in an angular position (with reference to the axis of the shaft 6) in which the angular displacement of the right-hand arm of the lever 11 (arrow $a$) does not suffice to reach the shaft 43 for the link 44.

If the average distance between the subject and the objective for exposures with flash is 2.75 meters, the relationship between the sizes of the diaphragm aperture ($f$/number) and the sensitivity of film (in DIN norms) can be selected as follows:

| Aperture: | Sensitivity |
|---|---|
| 5.6 | 15 |
| 8 | 18 |
| 11 | 21 |
| 16 | 24 |

In using a black-and-white film, the just mentioned relationship between the $f$/number and film sensitivity will produce satisfactory exposures with flash within a distance range of 1.4 to 5.5 meters. In using a color film, the distance range is between 2 and 4 meters, it being assumed that a black-and-white film can stand over- and underexposures of two diaphragm clicks and that a color film can stand over and underexposures of one diaphragm click.

The distance from the subject can be selected by using a fixed focus objective which is adjusted for the aforementioned distance or by using an objective with a focus adjusting device of any known design. In the latter instance, the focus adjusting device includes a scale wherein the graduation indicating the distance of 2.75 meters is identified by a thunderbolt or another symbol which indicates operation with flash.

If the operator thereupon decides to make an exposure in daylight, the multiple flash bulb holder 17 is detached from the housing H so that the spring 22 is free to return the selector 19 to upper end position. The trip 23 closes the master switch 4 and the exposure meter is ready to select the angular position of the needle 2 with reference to the body 1 as a function of the intensity of scene light. At the same time, the stop 40 of the selector 19 rocks the lever 36 in a direction counter to that indicated by the arrow $b$ so that the free end of the lever 36 moves away from the cam face 32. The thus rocked lever 36 permits the intermediate lever 37 to follow the bias of the spring 41 and to move the diaphragm ring 45 to an end position in which the shaft 43 is located in the path of movement of the intermediate lever 11 so that the latter can select the size of the aperture in response to depression of the shutter release trigger 14 in a manner as described above.

Figure 2:
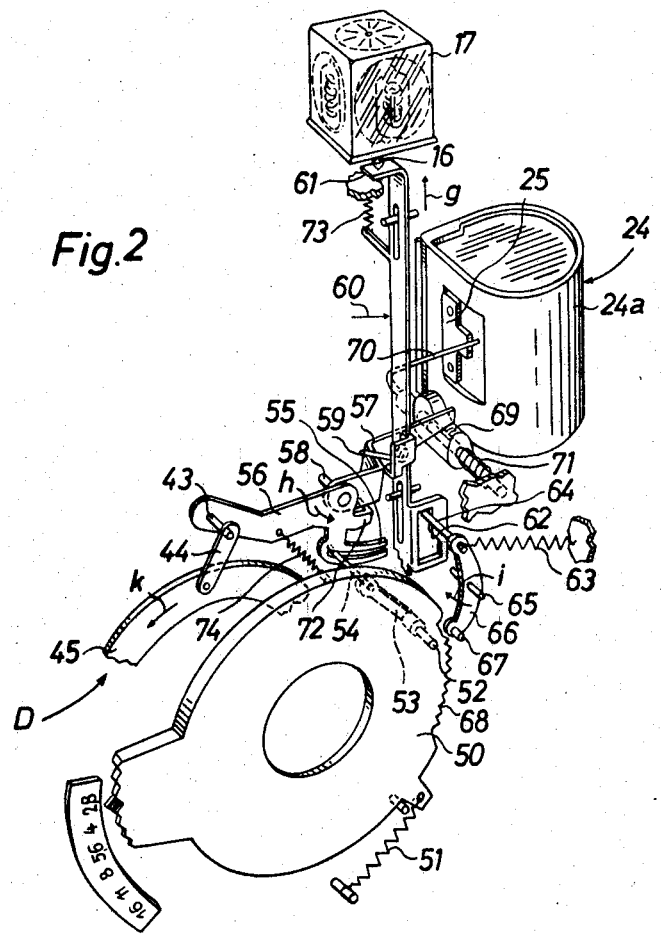
FIG. 2 is a similar perspective view of a portion of a modified camera wherein the size of the aperture for operation in daylight is selected by hand.

FIG. 2 illustrates a portion of a modified still camera wherein the size of the diaphragm aperture for exposures in daylight is selected by hand. The manually operated adjusting means for the diaphragm ring 45 comprises an annular adjusting member 50 which is biased by a helical return spring 51 so that it tends to turn in a clockwise direction. The adjusting member 50 is provided with a shaft 52 for a link 53 which carries a pin 54 extending into an arcuate slot 55 provided in an arm of an intermediate lever 56 corresponding to the intermediate lever 37 of FIG. 1 and carrying the aforementioned shaft 43 for the link 44 which is articulately coupled to the diaphragm ring 45. The intermediate lever 56 is pivotable on a fixed horizontal shaft 58 which also carries a lever 57 corresponding to the lever 36 of FIG. 1. The lever 57 is biased by one leg of a torsion spring 59 mounted on a vertically reciprocable selector 60 which corresponds to the selector 19 of FIG. 1 and has a bent-over lug 61 adapted to be depressed by the plug 16 of a multiple flash bulb holder 17. The selector 60 is biased to its upper end position by a return spring 73. The lower end of the selector 60 carries an operating cam 62 whose face can be tracked by a second follower here shown as a pin 64 mounted on one arm of a two-armed detent lever 66 which is pivotable on a horizontal pin 65 and is biased by a helical spring 63 which tends to turn it in a clockwise direction (arrow $i$) so that the pin 63 bears against the face of the operating cam 62. The lower arm of the detent lever 66 carries a detent pin 67 which can engage a toothed or serrated portion 68 of the adjusting member 50.

The follower 70 of the camera shown in FIG. 2 is rigidly connected with a control cam 69 which corresponds to the control cam 33 of FIG. 1. The cam 69 is biased by a helical spring 71 and is reciprocable along (but cannot turn on) a fixed guide rod. The manner in which the follower 70 is displaced by the marker 25 on the shell of the cartridge 24 is the same as described in connection with FIG. 1. The spring 71 insures that the follower 70 remains in abutment with the marker 25.

FIG. 2 illustrates the selector 60 in the lower end position in which the selector is held by the plug 16 of the multiple flash bulb holder 17. The spring 73 biases the lug 61 against the plug 16 and the lever 57 bears against the face of the cam 69 so that the angular position of the lever 57 is a function of the sensitivity of film in the cartridge 24. The lever 57 bears against a motion receiving portion 72 of the intermediate lever 56 so that the latter selects the size of the diaphragm aperture as a function of the sensitivity of film in the cartridge 24. Such selection of the aperture size is effected through the intermediary of the shaft 43, link 44 and diaphragm ring 45 against the opposition of a spring 74. The exposure will be made in response to depression of the shutter release trigger which is not shown in FIG. 2.

If the operator thereupon decides to make an exposure in daylight, the plug 16 of the multiple flash bulb holder 17 is withdrawn from its socket (not shown) so that the spring 73 contracts and returns the selector 60 to the upper end position (arrow $g$). During such upward movement of the selector 60, the levers 56, 57 turn in a counterclockwise direction (arrow $h$) because the lever 57 is biased by the spring 74. The lever 56 comes to a halt when arrested by the diaphragm ring 45 (i.e., when the ring 45 has caused the blades of the diaphragm D to define an aperture of a maximum size). The lever 57 is then entrained by a stop 75 on the selector 60 and continues to turn in counterclockwise direction (arrow $h$) so that its right-hand end is raised above the face of the control cam 69.

The upwardly moving selector 60 lifts the operating cam 62 so that the pin 64 can move to the right, as viewed in FIG. 2, i.e., the spring 63 turns the detent lever 66 in a clockwise direction (arrow $i$) whereby the detent pin 67 engages the serrated portion 68 of the adjusting member 50.

In order to select the size of the aperture for operation in daylight, the operator simply turns the adjusting member 50 under or against the bias of the spring 51 (which is weaker than the spring 63) whereby the shaft 52 turns the diaphragm ring 45 through the intermediary of link 53, pin 54, intermediate lever 56, shaft 43 and link 44. If the member 50 is turned in a counterclockwise direction, as viewed in FIG. 2, the diaphragm ring 45 will be caused to turn in the same direction (arrow $k$). The adjusting member 50 will remain in the selected position because the pin 67 bears against the serrated portion 68 under the action of the spring 63 which is stronger than the spring 51.

To make again an exposure with artificial illumination of the subject, the operator inserts a fresh multiple flash bulb holder 17 to move the selector 60 to the lower end position. The operating cam 62 causes the pin 64 to turn the detent lever 66 in a counterclockwise direction so that the pin 67 moves away from the serrated portion 68 whereby the spring 51 automatically returns the adjusting member 50 to the angular position of FIG. 2. The intermediate lever 56 turns under the bias of the spring 74 to the extent permitted by the lever 57, i.e., as a function of the position of the cam 69 and follower 70.

Of course, our camera is susceptible of many additional modifications without departing from the spirit of the present invention. As stated before, the iris diaphragm D of FIG. 1 or 2 can be replaced by a two-blade diaphragm. Also, the link train between the follower 27 or 70 and the diaphragm ring 45 may be constructed of lesser or greater number of parts or may be replaced by another motion transmitting device. Furthermore, the camera of FIG. 1 may be provided with an adjusting member corresponding to the member 50 of FIG. 2 to permit manual selection of the aperture size. All such and many other modifications of our invention will be readily understood without necessitating additional illustrations.

It is also clear that the multiple flash bulb holder 17 can be replaced by other sources of artificial light, for example, by a flash unit having a reflector and a socket for one flash bulb at a time. In such flash units, the reflector can be permanently installed in or on the housing of the camera and is movable between an operative position corresponding to the lower end position of the selector 19 or 60 and an inoperative or idle position in which it permits the selector 19 or 60 to return to the upper end position. The camera can be used with equal advantage with electronic flash units, as long as the guide number of the source of artificial light remains unchanged.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is set forth in the appended claims:

1. A photographic camera for use in daylight and with sources of artificial light having a predetermined guide number, comprising:
    (1) adjustable diaphragm means arranged to furnish a series of apertures;
    (2) follower means automatically movable by markers provided on cartridges containing films of different sensitivities to assume a plurality of positions each of which corresponds to one of said film sensitivities;
    (3) motion transmitting means interposed between said follower means and said diaphragm means, said motion transmitting means being arranged to assume a first condition in which it adjusts said diaphragm means as a function of the position of said follower means and a second condition in which said diaphragm means is adjustable independently of said motion transmitting means; and
    (4) selector means for setting the camera for operation in daylight and artificial light, said selector means comprising a portion for respectively placing said motion transmitting means into said first and second condition when the camera is respectively set for operation in artificial light and daylight, said motion transmitting means comprising control means operative to adjust said diaphragm means to set
        (a) in the first condition of said motion transmitting means,
        (b) as a function of said predetermined guide number, and
        (c) as a function of the position of said follower means that aperture which insures proper exposure of the film within a predetermined range of distances from the subject.

2. A camera as defined in claim 1 for use with film cartridges of the type having markers each positioned with reference to the respective cartridge in such a way as to be indicative of the sensitivity of film in the cartridge, and further comprising a housing for film cartridges, said follower means being movable by the marker of that cartridge which is being inserted into said housing to assume a position which is a function of the sensitivity of film in the thus inserted cartridge.

3. A camera as defined in claim 1, wherein said selector means comprises a member which is movable between first and second positions respectively corresponding to the setting for operation in daylight and artificial light and normally tending to assume said first position, and further comprising a source of artificial light having said predetermined guide number, said source having a portion movable from an idle to an operative position to thereby move said member of said selector means to second position.

4. A camera as defined in claim 3, wherein said source is constituted by a multiple flash bulb holder which is detachable from the camera housing to thereby permit movement of said selector means to first position.

5. A camera as defined in claim 1, wherein said control means comprises a control member displaceable by said follower means and a linkage arranged to adjust said diaphragm means as a function of the position of said control member when the camera is set for operation in artificial light.

6. A camera as defined in claim 1, further comprising exposure meter means adjustable by said follower means and arranged to select the size of the aperture as a function of the intensity of scene light when the camera is set for operation in daylight.

7. A camera as defined in claim 1, further comprising manually operated adjusting means for selecting the aperture when the camera is set for operation in daylight.

8. A camera as defined in claim 7, further comprising detent means for yieldably holding said adjusting means in selected positions of adjustment in response to placing of said motion transmitting means into said first condition.

9. A camera as defined in claim 1, wherein said diaphragm means comprises an iris diaphragm having a plurality of blades and a ring rotatable about the optical axis and operatively connected with said blades and with said motion transmitting means.

10. A camera as defined in claim 1, wherein said control means comprises a control member which is displaceable by said follower means.

11. A camera as defined in claim 10, wherein said control member is rigid with said follower means.

12. A camera as defined in claim 1, wherein said follower means comprises a lever and said selector means comprises a slide.

13. A camera as defined in claim 1, wherein said selector means is movable between two end positions each of which corresponds to one condition of said motion transmitting means and wherein the means for moving the selector means to that position which corresponds to the second condition of said motion transmitting means comprises an indexible multiple flash bulb holder with four flash bulbs.

14. A camera as defined in claim 1, wherein said motion transmitting means comprises a pair of levers pivotable about a common axis, one of said levers having motion receiving means receiving motion from the other lever in response to placing of said motion transmitting means into said second condition and said one lever being arranged to adjust said diaphragm means.

15. A photographic camera for use in daylight and with sources of artificial light having a predetermined guide number, comprising adjustable diaphragm means arranged to furnish a series of apertures; follower means movable to a plurality of positions each of which corresponds to a different film sensitivity; motion transmitting means interposed between said follower means and said diaphragm means, said motion transmitting means being arranged to assume a first condition in which it adjusts said diaphragm means as a function of the position of said follower means and a second condition in which said diaphragm means is adjustable independently of said motion transmitting means; and selector means for setting the camera for operation in daylight and artificial light, said selector means comprising a portion for respectively placing said motion transmitting means into said first and second condition when the camera is respectively set for operation in artificial light and daylight, said motion transmitting means comprising a control member displaceable by said follower means and a linkage arranged to adjust said diaphragm means as a function of the position of said control member when the camera is set for operation in artificial light, said linkage comprising a lever engaging said control member in the first condition of said motion transmitting means and said portion of said selector means being arranged to disengage said lever from said control member in the second condition of said motion transmitting means.

16. A camera as defined in claim 15, wherein said control member is constituted by a cam having a face which is tracked by said lever in the second condition of said motion transmitting means.

17. A camera as defined in claim 15, wherein said linkage further comprises an intermediate lever arranged to receive motion from said first mentioned lever when the latter engages with said control member, said intermediate lever being operatively connected with said diaphragm means.

18. A camera as defined in claim 15, further comprising means for permanently biasing said lever toward engagement with said control member.

References Cited

UNITED STATES PATENTS

| | | | |
|---|---|---|---|
| 3,260,182 | 7/1966 | Nerwin | 95—31 |
| 3,322,051 | 5/1967 | Rentschler. | |
| 3,353,467 | 11/1967 | Ernisse | 240—1.3 XR |

NORTON ANSHER, Primary Examiner

D. S. STALLARD, Assistant Examiner